United States Patent [19]

Johnson

[11] 3,867,311

[45] Feb. 18, 1975

[54] METHOD OF MAKING CATALYTICALLY IMPREGNATED CERAMIC BURNING PADS

[75] Inventor: Carl E. Johnson, Brookhaven, Miss.

[73] Assignee: Nalco Chemical Company, Chicago, Ill.

[22] Filed: May 21, 1973

[21] Appl. No.: 362,609

[52] U.S. Cl............ 252/460, 252/466 PT, 252/472, 423/247
[51] Int. Cl.......................... B01j 11/08, B01j 11/22
[58] Field of Search..... 117/123 A, 123 B; 431/328, 431/329; 252/460, 472, 466 PT; 423/247

[56] References Cited
UNITED STATES PATENTS

| | | | |
|---|---|---|---|
| 2,865,785 | 12/1958 | Coles............................ | 117/123 B X |
| 3,191,659 | 6/1965 | Weiss................................ | 431/328 |
| 3,198,240 | 8/1965 | Keith et al......................... | 431/329 |
| 3,204,683 | 9/1965 | Ruff et al.......................... | 431/329 X |
| 3,312,526 | 4/1967 | Hanson et al................... | 252/472 X |
| 3,409,390 | 11/1968 | Hoekstra........................... | 423/247 |
| 3,697,447 | 10/1972 | Bettinardi....................... | 252/460 X |

FOREIGN PATENTS OR APPLICATIONS 662,460  12/1951  Great Britain...................... 423/247

*Primary Examiner*—C. Dees
*Attorney, Agent, or Firm*—John G. Premo; Robert A. Miller

[57] ABSTRACT

A method for treating platinum or palladium catalyzed porous ceramic burning pads of the type used in flameless gas heating and lighting devices. Certain catalytic substances such as thorium, alumina and silica-alumina, as well as combinations of these materials when combined with platinum or palladium, afford improved catalysts for porous ceramic burning pads of the type described above. Pads so treated reduce the carbon monoxide emissions from devices using these pads.

6 Claims, No Drawings

3,867,311

METHOD OF MAKING CATALYTICALLY IMPREGNATED CERAMIC BURNING PADS

INTRODUCTION

In the past several years the use of so-called flameless gas heating and lighting devices has increased greatly. These devices use as a fuel source such conventional hydrocarbon fuels as white gasoline, propane, natural gas, or liquified petroleum gas (LPG). In use, the fuel is passed through a gauze or porous felt pad which normally contains on its surface a small amount of a platinum catalyst. Combustion occurs with the air on the surface of the ceramic gauze or pad.

Flameless heaters and lighting devices of the type described, tend to produce undesirable levels of carbon monoxide when operating at optimum efficiency. While it is possible to reduce carbon monoxide emissions by reducing the fuel flow to the catalytic burning pads where it is combusted, this procedure is not a desirable operational technique. If it were possible to reduce the carbon monoxide emissions from such heaters or lighting devices while at the same time maintaining an optimum BTU output thereform, such devices would be rendered safer for use in poorly ventilated areas.

INVENTION

In accordance with the invention it has been found that platinum catalyzed porous ceramic burning pads of the type used in flameless gas heating and lighting devices may be chemically treated to reduce the carbon monoxide emission levels without sacrificing BTU output or efficiency when such devices are used to combust hydrocarbon fuel. This is accomplished by treating such pads with an aqueous solution or suspension of a catalytic substance from the group consisting of thorium, alumina, silica-alumina and combinations thereof and then drying said pads. In more specific terms, therefore, the invention is directed to improving the catalytic effectiveness of platinum which is placed on the surface of porous ceramic burning pads which are used in flameless gas heating and lighting devices. While the invention will be described primarily to preparing such pads which contain platinum already impregnated upon their surfaces, it is specifically understood that such description as well as the claims appended to this specification includes the concept of treating the pads concurrently, before or after the treatment with the catalytic substances used in this invention with platinum salts to produce a platinum catalyst on the pads. Also, it is well known that palladium is equivalent in most respects to platinum in catalytic application of the type described above. This invention, therefore, is also directed to improving the catalytic efficiency of palladium when used in these catalytic applications.

THE POROUS CERAMIC BURNING PADS

These pads may be in the form of ceramic gauzes, felt or fiberlike structures which are composed of high temperature ceramic materials such as glass wool, glass-rock fibers, alumina or mixtures of silica and alumina with such devices being so constructed so as to be porous in nature thereby allowing the passage of the vaporized fuel therethrough. This provides a relatively high surface area to allow contact of the fuel with the catalyst which is contained upon the surfaces of the gauze or the pads. The pads may be clothlike in consistency or they may be porous solid ceramic shapes.

THE CATALYSTS

As indicated, most of the ceramic pads of the type used in flameless gas heaters or lighters are impregnated with platinum or palladium solutions which are then dried and calcined to produce a burning pad which is capable of causing combustion of the gaseous hydrocarbon fuel at about the surface of the pad. This combustion generates substantial quantities of heat or light without the production of a visible flame. The platinum or palladium is most commonly placed or impregnated into the pad by dipping, spraying or treating the pads or other ceramic surfaces with aqueous solutions of a water-soluble platinum or palladium compound. The pads are then dried and then fired for a short period of time to produce the finished catalytically treated pad.

Platinum or palladium treated pads of the above type when used in flameless gas heaters tend to produce carbon monoxide emission levels of from 75 up to several hundred ppm when the gas flow is adjusted to give optimum BTU outputs. The industry has been seeking to produce flameless heating devices which give carbon monoxide emission values less than 50 ppm without sacrificing thermal efficiency.

THE CATALYTIC SUBSTANCES OF THE INVENTION

The catalytic substances of the invention comprise thorium, silica-alumina and mixtures of these materials including specifically silica ($SiO_2$) and alumina ($Al_2O_3$) combined in a weight ratio varying between 10:1 to 1:10. All of these catalytic substances when used to treat platinum or palladium catalyzed porous ceramic burning pads in relatively small quantities make it possible to maintain the combustion efficiency of such pads, yet, at the same time, dramatically reduce the caron monoxide emissions generated by such pads under normal conditions of use.

The catalytic substances of the invention are applied to the pads, gauzes or other ceramic porous ceramic surfaces by impregnating them onto such surfaces from aqueous solutions of water-soluble forms of these chemical substances. Thus, water-soluble thorium salts, aluminum salts, silica sols, alkali metal silicates and the like may be used. Particularly illustrative are such specific compounds as thorium nitrate, sodium or potassium aluminate, aqueous colloidal silica sols or sodium or potassium silicates, the latter of which forms silica by a precipitation reaction with a suitable acidic material such as sulfuric acid.

When alumina or silica-alumina are used as catalytic substances in the practice of the invention, their efficiency is improved if they are combined with an alkali metal such as potassium or sodium with potassium being preferred. Thus, for example, if these compositions are prepared from potassium or sodium silicates and/or aluminates with the alkali metal portion or at least a part thereof being allowed to remain in the finished catalyst improved catalytic efficiency often times will be evidenced.

The above compounds are prepared in the form of dilute aqueous solutions which may be dipped, sprayed or coated by other suitable means onto the ceramic pads. The solutions may be applied after the platinum or palladium has been placed on the pads, before the platinum or palladium is placed on the pads or the platinum or palladium may be combined at the same time by using well known coprecipitation techniques with all of the catalytic ingredients being present in one solution or dispersion.

The amount of platinum or palladium used to treat ard propane fired flameless gas heater of commercial design and the carbon monoxide emissions therefrom measured with standard laboratory equipment. The unit was adjusted to operate at 5000 BTU per hour using an 11 inch head of gas pressure. The results of these tests are set forth in Table I. In Table I the quantities of the solutions used to treat the pads are in units of grams.

TABLE I

| | Sodium Aluminate 228 NaOH 336 Al(OH)$_3$ 393 Water | Potassium Aluminate 370 KOH 336 Al(OH)$_3$ 393 Water | Acid Silica Sol 8.2% SiO$_2$ 0.01% Na in Water Alcohol | Platinum Solution 1 gm H$_2$PtCl$_6$[1] per 65 gm Soln. | Thorium Solution 22 gm Th(NO$_3$)$_4$[2] per 300 gm. Soln | Analysis of Pads | | | |
|---|---|---|---|---|---|---|---|---|---|
| | | | | | | CO | Temp. | CO | Temp. |
| 1 | 15 | — | 23 | 25 | 50 | 50 ppm | 505°C | 60 ppm | 510°C |
| 2 | — | 15 | 23 | 25 | 50 | 30 ppm | 475°C | 40 ppm | 480°C |
| 3 | — | — | — | 25 | 50 | 70 ppm | 500°C | 180 ppm | 490°C |
| 4 | — | — | — | 25 | — | 2000 ppm | 470°C | 1000 ppm | 470°C |
| 5 | — | 25 | 37 | 25 | 50 | 10 ppm | 525°C | <10 ppm | 530°C |
| 6 | 22 | — | 37 | 25 | 50 | 20 ppm | 515°C | 20 ppm | 525°C |
| 7 | — | 25 | 24 | 25 | 50 | 30 ppm | 535°C | 30 ppm | 530°C |
| 8 | — | 25 | — | 25 | 50 | 40 ppm | 545°C | 70 ppm | 550°C |
| 9 | — | 25 | 37 | 25 | — | 90 ppm | 520°C | 50 ppm | 515°C |
| 10 | — | — | 37 | 25 | 50 | 100 ppm | 505°C | 90 ppm | 515°C |

[1] 6H$_2$O
[2] 4H$_2$O porous ceramic burning pads varies considerably based on the particular flameless device to be produced therefrom. In most instances, however, good catalytic affects are achieved when 1½ mg of platinum or palladium per square inch of pad surface is employed. Greater amounts may be used, e.g., as much as 50 mg of platinum or palladium per square inch of pad. The amount of catalytic substances used to treat the pads in relationship to the platinum or palladium used may be expressed in terms of a ratio wherein the ratio of the catalytic substance to platinum or palladium is at least 1.5:1 and preferably is at least 2:1. Higher amounts such as 5:1 may be used but beyond this point no additional advantage is achieved and the cost of the impregnation treatment becomes excessive.

After the burning pad has been impregnated with both the platinum or palladium and the catalytic substances of the invention, the pads are then dried at a modest temperature to evaporate the water therefrom. This temperature may range from as low as 100°C. up to 200°C. to 300°C. for periods of time ranging between 1-6 hours. After the water has been removed by this treatment the pads are preferably given a calcining treatment which ranges between 600°C.–1,000°C. for as little a time as ½ hour-6 hours. The calcining temperature may vary depending upon the particular constitution of the pad, the nature of the catalyst and the like.

EXAMPLES

To illustrate the invention to best advantage a series of solutions were prepared which contained a source of silica, alumina, platinum and thorium. These solutions were applied to preformed flameless gas heater pads having an approximate area of 7 inches × 11 inches. The treated pads were then dried at 180°C. for 2 hours to remove water. They were then calcined in a furnace at 600°C. for 2 hours. They were then placed in a stand-

Having thus described my invention, it is claimed as follows:

1. A method of treating platinum or palladium catalyzed porous ceramic burning pads of the types used in flameless gas heating and lighting devices to reduce carbon monoxide emission levels when such devices are used to burn hydrocarbon fuels which comprise the steps of impregnating said pads with an aqueous solution or dispersion of a catalytic substance containing at least one member from the group consisting of thorium, alkali metal aluminates, silica sols containing a low level of alkali metal and combinations thereof to provide a ratio of catalytic substance or substances to platinum or palladium of at least 1.5 to 1 and then heating said pads at a temperature of from 100 to 300°C for a period of time ranging from .5 to 6 hours to produce a catalytically active porous pad.

2. The method of claim 1 where at least one of the catalytic substances is a water soluble compound of thorium and the weight ratio of thorium to platinum or palladium is at least 2:1.

3. The method of claim 1 where at least one of the catalytic substances is an alkali metal aluminate and the weight ratio of alumina to platinum or palladium is at least 2:1.

4. The method of claim 1 wherein at least one of the catalytic substances is a silica sol containing a low amount of an alkali metal salt combined with an alkali metal aluminate wherein the weight ratio of silica and alumina to platinum or palladium is at least 2:1 and the weight ratio of silica to alumina is 10:1 to 1:10.

5. The method of claim 3 wherein an alkali metal is also present as a soluble salt in said aqueous solution or dispersion of catalytic substance.

6. The method of claim 4 wherein an alkali metal is also present as a soluble salt in said aqueous solution or dispersion of catalytic substance.

* * * * *